US012671046B2

(12) United States Patent
Kamiya et al.

(10) Patent No.: US 12,671,046 B2
(45) Date of Patent: Jun. 30, 2026

(54) RELAY UNIT

(71) Applicant: DENSO CORPORATION, Kariya-city (JP)

(72) Inventors: Yuki Kamiya, Kariya-city (JP); Hiroaki Higuchi, Kariya-city (JP)

(73) Assignee: DENSO CORPORATION, Kariya (JP)

( * ) Notice: Subject to any disclaimer, the term of this patent is extended or adjusted under 35 U.S.C. 154(b) by 246 days.

(21) Appl. No.: 18/662,106

(22) Filed: May 13, 2024

(65) Prior Publication Data

US 2024/0297006 A1 Sep. 5, 2024

Related U.S. Application Data

(63) Continuation of application No. PCT/JP2022/039487, filed on Oct. 24, 2022.

(30) Foreign Application Priority Data

Nov. 15, 2021 (JP) ................................. 2021-185882

(51) Int. Cl.
 *H01H 50/12* (2006.01)
 *B60L 53/302* (2019.01)
(52) U.S. Cl.
 CPC ........... *H01H 50/12* (2013.01); *B60L 53/302* (2019.02)

(58) Field of Classification Search
 CPC ....... H01H 50/12; B60L 53/302; B60L 50/60; B60L 53/14; B60L 53/16; B60L 58/26; H02J 7/00
 See application file for complete search history.

(56) References Cited

U.S. PATENT DOCUMENTS

2013/0127413 A1* 5/2013 Ohtomo ..................... B60L 3/04
                                                    320/109
2018/0301983 A1   10/2018  Okazaki et al.
2020/0094701 A1    3/2020  Asai et al.

FOREIGN PATENT DOCUMENTS

JP       2014-079093 A     5/2014
JP       2021-023019 A     2/2021

* cited by examiner

*Primary Examiner* — Mohamad A Musleh
(74) *Attorney, Agent, or Firm* — Oliff PLC

(57) ABSTRACT

A relay unit includes a first busbar, a relay device, a second busbar, and a heat dissipation structure. The first busbar forms at least a part of an electric current path between a connecting portion, which is connected to a charging connector of an external charging device, and an in-vehicle battery. The relay device is provided on the first busbar. The second busbar forms at least a part of an electric current path between the in-vehicle battery and a power conversion device. The first busbar is branched at a branch portion from the second busbar, and includes at least a part of an electric current path extending from the branch portion to the connection portion via the relay device. The heat dissipation structure dissipates the heat from at least a part of the first busbar between the branch portion and the relay device.

12 Claims, 6 Drawing Sheets

FIG. 2A
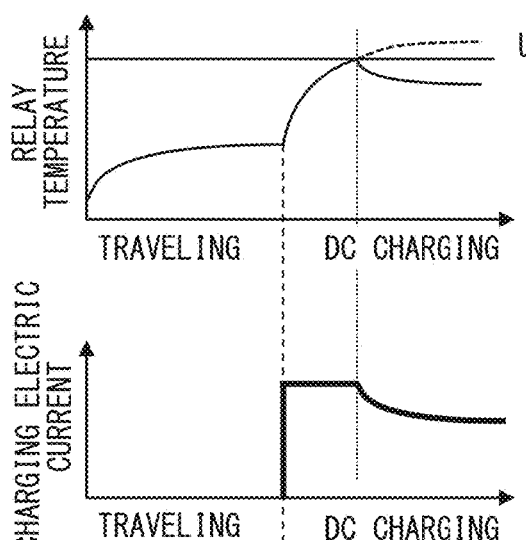
FIG. 2B
FIG. 3A
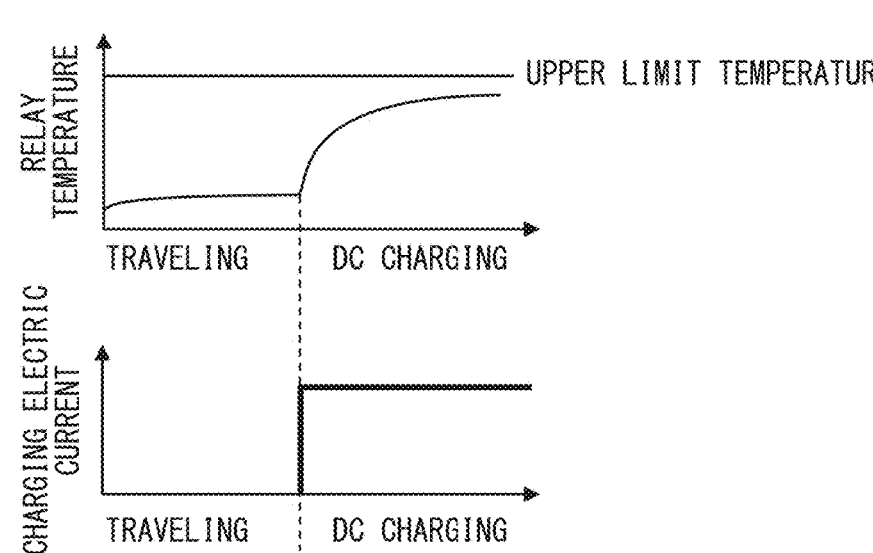
FIG. 3B

HEAT DISSIPATION

HEAT DISSIPATION

RELAY UNIT

CROSS REFERENCE TO RELATED APPLICATIONS

The present application is a continuation application of International Patent Application No. PCT/JP2022/039487 filed on Oct. 24, 2022, which designated the U.S. and claims the benefit of priority from Japanese Patent Application No. 2021-185882 filed on Nov. 15, 2021. The entire disclosures of all of the above applications are incorporated herein by reference.

TECHNICAL FIELD

The present disclosure relates to a relay unit including a relay device that is closed when an in-vehicle battery is charged by an external charging device.

BACKGROUND

A vehicle includes a DC inlet and a DC charging relay. The DC inlet and the DC charging relay use DC to charge a power storage device mounted on the vehicle from a DC external charging device or a DC charging station.

SUMMARY

According to at least one embodiment, a relay unit includes a first busbar, a relay device, a second busbar, and a heat dissipation structure. The first busbar forms at least a part of an electric current path between a connecting portion, which is connected to a charging connector of an external charging device, and an in-vehicle battery. The relay device is provided on the first busbar and is closed when the in-vehicle battery is charged by the external charging device. The second busbar forms at least a part of an electric current path between the in-vehicle battery and a power conversion device, which is for driving a traveling motor. The first busbar is branched at a branch portion from the second busbar, and includes at least a part of an electric current path extending from the branch portion to the connection portion via the relay device. The heat dissipation structure dissipates the heat from at least a part of the first busbar between the branch portion and the relay device.

BRIEF DESCRIPTION OF DRAWINGS

FIGS. 2A and 2B are graphs illustrating an example of a change in a relay temperature and a change in a charging electric current in a case where a heat dissipation structure is not provided in a first busbar between a branch portion with a second busbar and the relay device.

FIGS. 3A and 3B are graphs illustrating an example of a change in the relay temperature and a change in the charging electric current in a case where the heat dissipation structure is provided in the first busbar between the branch portion with the second busbar and the relay device.

DETAILED DESCRIPTION

Figure 1:
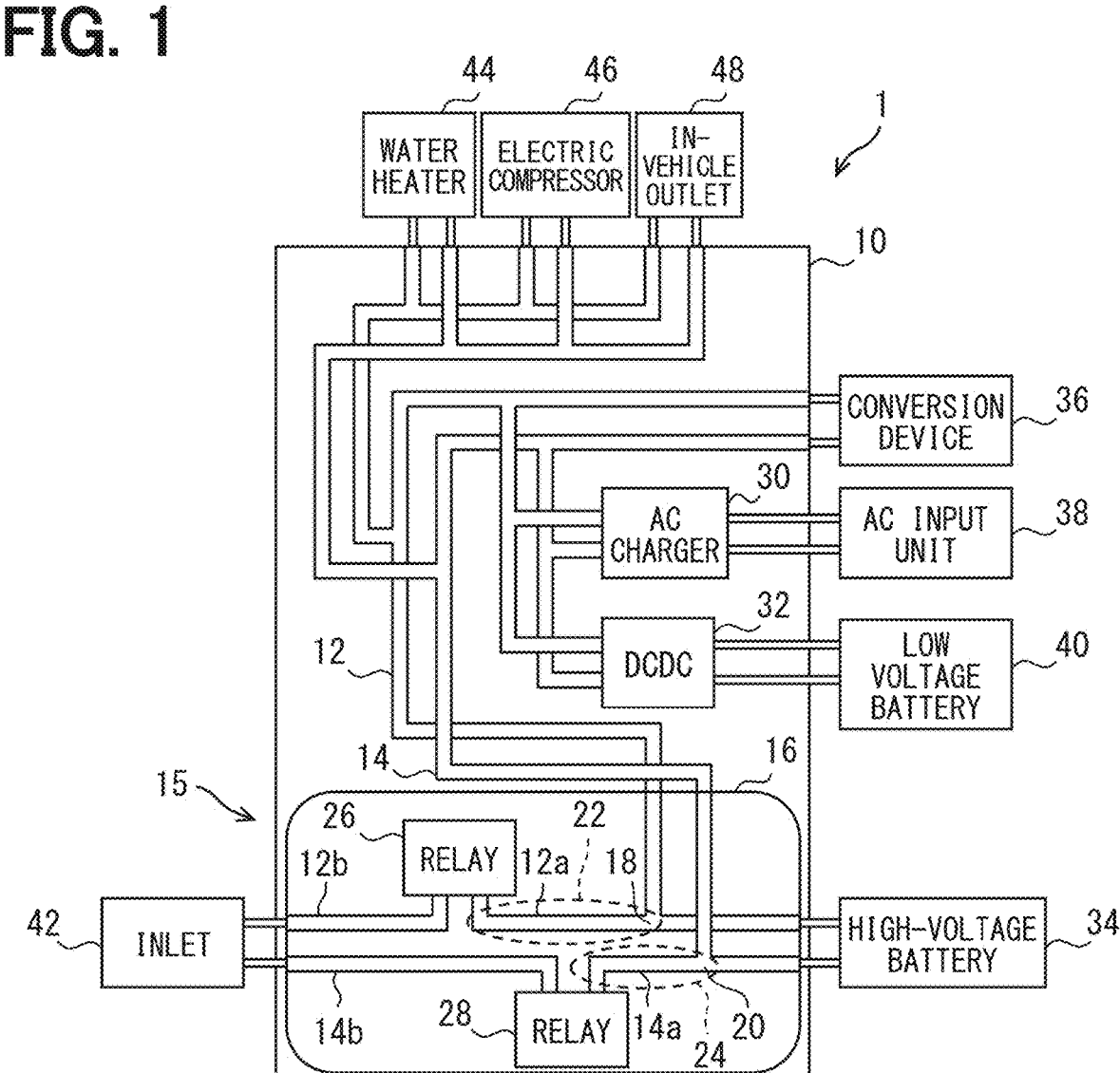
FIG. 1 is a block diagram illustrating an example of an internal configuration of a power distribution device including a relay unit according to an embodiment of the present disclosure for charging a high-voltage battery mounted on a vehicle or supplying power from the high-voltage battery to various in-vehicle electrical loads and an in-vehicle electrical load connected to the power distribution device.

To begin with, examples of relevant techniques will be described.

A vehicle according to a comparative example includes a DC inlet and a DC charging relay. The DC inlet and the DC charging relay use DC to charge a power storage device mounted on the vehicle from a DC external charging device or a DC charging station. The vehicle includes a motor generator that is driven by electric power stored in the power storage device. The motor generator causes the vehicle to travel.

In the vehicle of the comparative example, the DC charging relay is closed when the power storage device is charged with DC electric power supplied from the DC external charging device to the DC inlet. During DC charging, a charging electric current for DC charging is supplied to the DC charging relay, so that a temperature of the DC charging relay increases with time. In a case where an upper limit temperature is set for the DC charging relay, when the temperature of the DC charging relay reaches the upper limit temperature due to a temperature rise, the charging electric current needs to be reduced by a current limiting circuit provided in the vehicle or by instructing the DC external charging device to limit the electric current. There is an issue that a charging time of the power storage device becomes long when the charging electric current is reduced.

It is conceivable to address the above issue by increasing a heat resisting temperature of the DC charging relay. However, in this case, another issue such as an increase in a size of the DC charging relay or an increase in cost of the DC charging relay may occur.

In contrast to the comparative example, according to a rely unit of the present disclosure, a temperature of a relay device from reaching an upper limit temperature during charging of an in-vehicle battery via the relay device can be reduced without causing an increase in a size and cost of the relay device.

According to one aspect of the present disclosure, a relay unit includes a first busbar, a relay device, a second busbar, and a heat dissipation structure. The first busbar forms at least a part of an electric current path between a connecting portion, which is connected to a charging connector of an external charging device, and an in-vehicle battery. The relay device is provided on the first busbar and is closed when the in-vehicle battery is charged by the external charging device. The second busbar forms at least a part of an electric current path between the in-vehicle battery and a power conversion device, which is for driving a traveling motor. The first busbar is branched at a branch portion from the second busbar, and includes at least a part of an electric current path extending from the branch portion to the connection portion via the relay device. The heat dissipation structure dissipates the heat from at least a part of the first busbar between the branch portion and the relay device.

According to this configuration, the electric power is supplied from the in-vehicle battery to the power conversion device via the second busbars in order to drive the traveling motor by the power conversion device when the vehicle travels. Therefore, the temperature of the second busbars increases during the traveling of the vehicle. The temperature of the relay device rises when the temperature rise of the second busbar is transmitted from the branch portion to the relay device via the first busbar. There is a high possibility that the temperature of the relay device easily reaches an upper limit temperature when the charging of the in-vehicle battery by the external charging device is started from a state in which the temperature of the relay device has risen.

Therefore, in the relay unit according to the present disclosure, the heat dissipation structure for dissipating heat from at least the first busbar between the branch portion and the relay device is provided. This heat dissipation structure makes it difficult for heat to be transferred from the second busbar to the relay device via the first busbar. As a result, the temperature rise of the relay device can be reduced while the vehicle is traveling. Therefore, the possibility that the temperature of the relay device reaches the upper limit temperature at the time of charging the in-vehicle battery by the external charging device after the vehicle travels can be reduced.

The reference symbols in parentheses in "Claims" merely indicate examples of a correspondence relationship with a specific configuration in an embodiment to be described later, in order to facilitate understanding of the present disclosure. The reference symbols are not intended to limit the scope of the present disclosure in any way.

Technical features described in "Claims" other than the above-mentioned features become apparent from the description of the embodiments and the accompanying drawings.

Hereinafter, embodiments of the present disclosure will be described with reference to the drawings. FIG. 1 is a block diagram illustrating an example of an internal configuration of a power distribution device including a relay unit 15 for charging a high-voltage battery 34 mounted on a vehicle or supplying power from the high-voltage battery 34 to various in-vehicle electrical loads and an in-vehicle electrical load connected to the power distribution device 1.

The power distribution device 1 has a traveling electric motor as a traveling drive source of the vehicle. The power distribution device 1 is mounted on a vehicle having a high-voltage battery 34 which is externally chargeable, for example, an electric vehicle, a fuel cell vehicle, or a plug-in hybrid vehicle.

The high-voltage battery 34 is, for example, a secondary battery such as a nickel-metal hydride battery or a lithium ion battery. The high-voltage battery 34 may be a battery having a liquid electrolyte between a positive electrode and a negative electrode, or may be a battery having a solid electrolyte (all-solid battery). The high-voltage battery 34 is capable of supplying high-voltage power of, for example, 100 V or more.

As shown in FIG. 1, the power distribution device 1 includes first busbars 12a, 12b, 14a, 14b that form at least a part of a current path between an inlet 42, which is connected to a charging connector of a DC external charging device and performs DC quick charging, and the high-voltage battery 34. The first busbars 12a, 12b, 14a, 14b include high-potential first busbars 12a, 12b forming high-potential current paths and low-potential first busbars 14a, 14b forming low-potential current paths.

The high-potential first busbars 12a, 12b and the low-potential first busbars 14a, 14b are respectively provided with a high-potential relay device 26 and a low-potential relay device 28. That is, the high-potential relay device 26 is provided between the high-potential first busbar 12a and the high-potential first busbar 12b. The high-potential first busbar 12a is a part of a current path between the high-voltage battery 34 and the high-potential relay device 26. The high-potential first busbar 12b is a part of a current path between the inlet 42 and the high-potential relay device 26. The low-potential relay device 28 is provided between the low-potential first busbar 14a and the low-potential first busbar 14b. The low-potential first busbar 14a is a part of a current path between the high-voltage battery 34 and the low-potential relay device 28. The low-potential first busbar 14b is a part of a current path between the inlet 42 and the low-potential relay device 28.

The high-potential first busbar 12a is a part of the current path between the high-voltage battery 34 and the high-potential relay device 26. The high-potential first busbar 12a branches from a high-potential second busbar 12, which will be described later, at a branch portion 18. The high-potential first busbar 12a connects the branch portion 18 and the high-potential relay device 26. The low-potential first busbar 14a is a part of the current path between the high-voltage battery 34 and the low-potential relay device 28. The low-potential first busbar 14a branches from a low-potential second busbar 14, which will be described later, at a branch portion 20. The low-potential first busbar 14a connects the branch portion 20 and the low-potential relay device 28. For the sake of explanation, the first busbars 12a, 14a and the second busbars 12, 14 are distinguished from each other. However, in practice, the first busbars 12a, 14a and the second busbars 12, 14 are integrally formed of an electrically conductive metal such as copper. However, the first busbars 12a, 14a and the second busbars 12, 14 may be formed as separate bodies, and may be joined by welding, screwing, or the like later.

As shown in FIG. 1, the power distribution device 1 includes second busbars 12, 14 that form at least a part of a current path for supplying power from the high-voltage battery 34 to various in-vehicle electrical loads. The second busbars 12, 14 include the high-potential second busbar 12 forming a high-potential current path and the low-potential second busbar 14 forming a low-potential current path. As shown in FIG. 1, the various in-vehicle electrical loads to which the high-voltage power is supplied from the high-voltage battery 34 via the second busbars 12, 14 include a power conversion device 36, a DCDC converter 32, a water heater 44, an electric compressor 46 of an air conditioner, an in-vehicle outlet 48, and the like. However, the in-vehicle electrical loads are not limited to these examples, and one or more of the above-described in-vehicle electrical loads may be omitted, or in-vehicle electrical loads other than the above-described in-vehicle electrical loads may be included.

The power conversion device 36 drives the traveling electric motor by converting DC power supplied from the high-voltage battery 34 into AC power and outputting the AC power to the traveling electric motor. For example, a three-phase synchronous motor can be used as the traveling electric motor. In this case, the power conversion device 36 converts DC power into three-phase AC power and outputs the three-phase AC power to the traveling electric motor. The power conversion device 36 can convert AC regenerative electric power generated by the traveling electric motor into DC power when the vehicle is braked, for example. The converted DC power is supplied to the various in-vehicle electrical loads and is used to charge the high-voltage battery 34. The power conversion device 36 includes an inverter for performing conversion between DC and AC, and a converter for boosting the voltage of DC power supplied from the high-voltage battery 34 and supplying the boosted voltage to the inverter.

The DCDC converter 32 steps down a high voltage supplied from the high-voltage battery 34 to a low voltage, for example, 12 V, and supplies the low voltage to a low voltage battery 40. The low voltage battery 40 is mounted on the vehicle and supplies the low voltage power to various low voltage auxiliary machines, for example, meters, lights, power steering, power windows, and audio equipment, which use low-voltage power.

The water heater 44 may be, for example, a PTC heater. The water heater 44 heats water circulating in a pipe, for example. The heated water may be used to heat a vehicle compartment, seats, and/or the traction electric motor. The electric compressor 46 of the air conditioner (A/C) is driven by the high-voltage electric power supplied by the high-voltage battery 34, and is thus capable of compressing refrigerant in a refrigeration cycle even when the vehicle is stopped. Therefore, even when the vehicle is stopped, the vehicle compartment can still have air conditioning. The in-vehicle outlet 48 is, for example, a 100 V inverter, and provides AC power capable of operating home electric equipment. Therefore, a user can use an electric device brought into the vehicle by connecting the electric device to the in-vehicle outlet 48.

The high-voltage battery 34 can be charged not only by the above-described regenerative electric power but also by AC power or DC power supplied from an outside device. More specifically, the power distribution device 1 includes an AC charger 30 in order to be chargeable with AC power. The AC charger 30 is connected to the AC input unit 38. The AC input unit 38 is connectable to a connector of a charging cable of an AC external charging device. The AC charger 30 converts the supplied AC power into DC power having a voltage corresponding to the voltage of the high-voltage battery 34 when the connector of the charging cable is connected to the AC input unit 38 and the AC power is supplied from the AC external charging device. The converted DC power is provided to the high-voltage battery 34 through the second busbars 12, 14. In this manner, the high-voltage battery 34 is charged by the AC power supplied by the AC external charging device.

As described above, in the power distribution device 1, the high-potential relay device 26 provided in the high-potential first busbars 12a, 12b and the low-potential relay device 28 provided in the low-potential first busbars 14a,

14b are closed, so that the high-voltage battery 34 can be connected to the DC external charging device that performs DC rapid charging. Therefore, the high-voltage battery 34 can be rapidly DC charged using the DC power supplied from the DC external charging device. The DC external charging device may perform rapid DC charging or normal DC charging. In addition, the high-potential relay device 26 and the low-potential relay device 28 are configured such that their respective open/closed states can be switched by a control device (not shown) of the power distribution device 1. More specifically, the control device of the power distribution device 1 closes the high-potential relay device 26 and the low-potential relay device 28 when the high-voltage battery 34 is DC charged by the DC external charging device, and maintains the open state of the high-potential relay device 26 and the low-potential relay device 28 when the DC charging is not performed.

Furthermore, the power distribution device 1 may include a current limiting circuit so that the charging current can be limited when a temperature of the high-potential relay device 26 and/or the low-potential relay device 28 rises for some reason and reaches an upper limit temperature. Additionally or alternatively, the power distribution device 1 may instruct the DC external charging device to limit the charging current when the temperature of the high-potential relay device 26 and/or the low-potential relay device 28 reaches the upper limit temperature.

The power distribution device 1 includes a housing 10 that houses components such as the first busbars 12a, 12b, 14a, 14b, the second busbars 12, 14, the high-potential relay device 26, the low-potential relay device 28, the AC charger 30, the DCDC converter 32, and the control device described above. The housing 10 is made of a metal having good heat conductivity such as aluminum or copper. Note that some of the components, such as the AC charger 30 or the DCDC converter 32, which are described as being located within the housing 10, may be provided outside of the housing 10. Conversely, a component, such as the power conversion device 36, of the in-vehicle electrical load described as being provided outside the housing 10 may be housed within the housing 10.

In the housing 10, the high-potential relay device 26, the low-potential relay device 28, the first busbars 12a, 12b, 14a, 14b connected to the respective relay devices 26, 28, and portions of the second busbars 12, 14 extending from the branch portions 18, 20 are subassembled to form the relay unit 15.

The present embodiment is characterized in that the relay unit 15 is provided with a heat dissipation structure for dissipating heat from at least the high-potential first busbar 12a between the branch portion 18 and the high-potential relay device 26 and the low-potential first busbar 14a between the branch portion 20 and the low-potential relay device 28 in the ranges 22, 24 indicated by dotted lines in FIG. 1.

The high voltage power is supplied from the high-voltage battery 34 to the power conversion device 36 via the second busbars 12, 14 in order to drive the traveling electric motor by the power conversion device 36 when the vehicle travels. The power conversion device 36 converts the regenerative electric power into the DC power when the traveling electric motor generates the regenerative electric power. The converted DC power is supplied to various in-vehicle electrical loads and the high-voltage battery 34 via the second busbars 12, 14. Therefore, the temperature of the second busbars 12, 14 increases during the traveling of the vehicle. The temperature of the high-potential relay device 26 and/or the low-potential relay device 28 is raised when heat of the second busbars 12, 14 is transferred from the branch portions 18, 20 to the high-potential relay device 26 and/or the low-potential relay device 28 via the first busbars 12a, 14a, as shown in FIG. 2A.

Then, the temperature of the high-potential relay device 26 and/or the low-potential relay device 28 is likely to easily reach the upper limit temperature when the charging of the high-voltage battery 34 by the DC external charging device is started from a state where the temperature of the high-potential relay device 26 and/or the low-potential relay device 28 is increased by the heat from the second busbars 12, 14, as shown in FIG. 2B. The charging current has to be reduced as shown in FIG. 2B by a current limiting circuit provided in the vehicle or by instructing the DC external charging device to limit the current when the temperature of the high-potential relay device 26 and/or the low-potential relay device 28 reaches the upper limit temperature. Reducing the charging current will increase a time it takes to fully charge the high-voltage battery 34.

Therefore, as described above, the relay unit 15 according to the present embodiment is provided with the heat dissipation structure for dissipating heat from at least the high-potential first busbar 12a between the branch portion 18 and the high-potential relay device 26 and the low-potential first busbar 14a between the branch portion 20 and the low-potential relay device 28. With this heat dissipation structure, an amount of heat dissipation per unit area of the high-potential first busbar 12a and the low-potential first busbar 14a between the branch portions 18, 20 and the high-potential relay device 26 and the low-potential relay device 28 is larger than an amount of heat dissipation per unit area of the high-potential second busbar 12 and the low-potential second busbar 14, respectively, which are not provided with the heat dissipation structure.

Therefore, by providing the heat dissipation structure, heat is less likely to be transferred from the second busbars 12, 14 to the high-potential relay device 26 and the low-potential relay device 28 via the first busbars 12a, 14a. As a result, as shown in FIG. 3A, the temperature rise of the high-potential relay device 26 and the low-potential relay device 28 can be reduced while the vehicle is traveling. Therefore, as shown in FIG. 3A, possibility that the temperatures of the high-potential relay device 26 and the low-potential relay device 28 reach the upper limit temperature can be reduced during the DC charging of the high-voltage battery 34 by the DC external charging device after the vehicle has traveled. As a result, as shown in FIG. 3B, possibility of avoiding a decrease in the charging current during DC charging can be reduced, and an increase in the charging time of the high-voltage battery 34 can be reduced.

The heat dissipation structure may be provided in only one of the high-potential first busbar 12a between the branch portion 18 and the high-potential relay device 26 and the low-potential first busbar 14a between the branch portion 20 and the low-potential relay device 28. In this case, the temperature rise of at least the high-potential relay device 26 or the low-potential relay device 28 corresponding to the high-potential first busbar 12a or the low-potential first busbar 14a provided with the heat dissipation structure can be reduced. When the heat dissipation structure is provided in only one of the high-potential first busbar 12a and the low-potential first busbar 14a, the heat dissipation structure may be provided in the high-potential first busbar 12a. This is because, since the high potential current is supplied to the high-potential second busbar 12, the temperature of the high-potential second busbar 12 is relatively higher than that of the low-potential second busbar 14. Further, in this case, the low-potential relay device 28 may be omitted.

The heat dissipation structure may not be formed over an entire high-potential first busbar 12a between the branch portion 18 and the high-potential relay device 26 and/or an entire low-potential first busbar 14a between the branch portion 20 and the low-potential relay device 28. In other words, the heat dissipation structure may be provided only in a part of the high-potential first busbar 12a between the branch portion 18 and the high-potential relay device 26 and/or a part of the low-potential first busbar 14a between the branch portion 20 and the low-potential relay device 28. This is because, if a heat dissipation structure is provided in a part of the high-potential first busbar 12a and/or a part of the low-potential first busbar 14a, a certain degree of heat transfer suppression effect from the second busbars 12, 14 to the high-potential relay device 26 and/or the low-potential relay device 28 can be expected.

Figure 4:
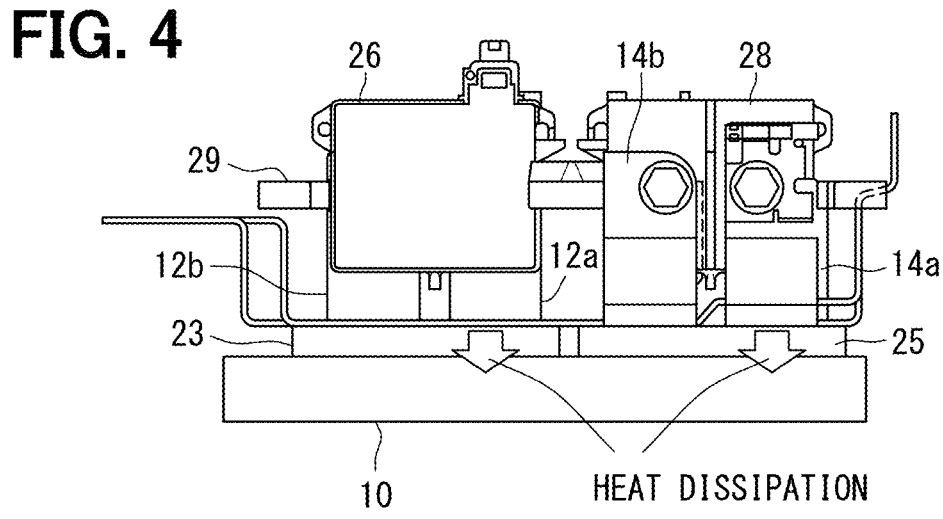
FIG. 4 is a side view illustrating an example of the heat dissipation structure for a high-potential first busbar and a low-potential first busbar in the relay unit.

Hereinafter, a specific example of the heat dissipation structure will be described with reference to the drawings. FIG. 4 is a side view showing an example of the heat dissipation structure for the high-potential first busbars 12a, 12b and the low-potential first busbars 14a, 14b in the relay unit 15.

In the example shown in FIG. 4, end portions of the high-potential first busbars 12a, 12b and the low-potential first busbars 14a, 14b, which are positioned near the relay devices 26, 28, are extending along lateral surfaces of the high-potential relay device 26 and the low-potential relay device 28, respectively. The end portions of the high-potential first busbars 12a, 12b and the low-potential first busbars 14a, 14b are screwed to the lateral surfaces of the high-potential relay device 26 and the low-potential relay device 28, respectively. A holding member 29 holds the high-potential relay device 26 and the low-potential relay device 28. The holding member 29 is fixed to the housing 10 or an outer frame 16 of the relay unit 15 described later.

Next, an example of a configuration of the high-potential relay device 26 and the low-potential relay device 28 will be described with reference to FIG. 5. Since the high-potential relay device 26 and the low-potential relay device 28 have the same configuration, the high-potential relay device 26 will be described as a representative example. In addition, in the example shown in FIG. 5, for convenience of explanation, the screws 102, 104 for screwing the end portions of the high-potential first busbars 12a, 12b are illustrated to be arranged in a vertical direction, but the screws 102, 104 are arranged in a horizontal direction, which is a depth direction in FIG. 4.

The screws 102, 104 are made of a conductive metal such as copper, aluminum, or an alloy. Then, the screws 102, 104 are screwed to the respective end portions of the high-potential first busbars 12a, 12b, so that the screws 102, 104 and the respective end portions of the high-potential first busbars 12a, 12b come into metal contact with each other. Tip portions of the screws 102, 104 extend to an internal space of the housing 100 of the high-potential relay device 26. A relay contact 106 is supported by a support member via a spring 108 with a predetermined gap between the tip portions of the screws 102, 104. The support member of the relay contact 106 is movable by the control device of the power distribution device 1. The tip portions of the screws 102, 104 come into contact with the relay contact 106 when the control device moves the support member of the relay contact 106 to closer to the screws 102, 104. As a result, the high-potential relay device 26 is closed. Conversely, the tip portions of the screws 102, 104 are separated from the relay contact 106 when the control device moves the support member of the relay contact 106 away from the screws 102, 104. As a relay, the high-potential relay device 26 is opened.

Figure 5:
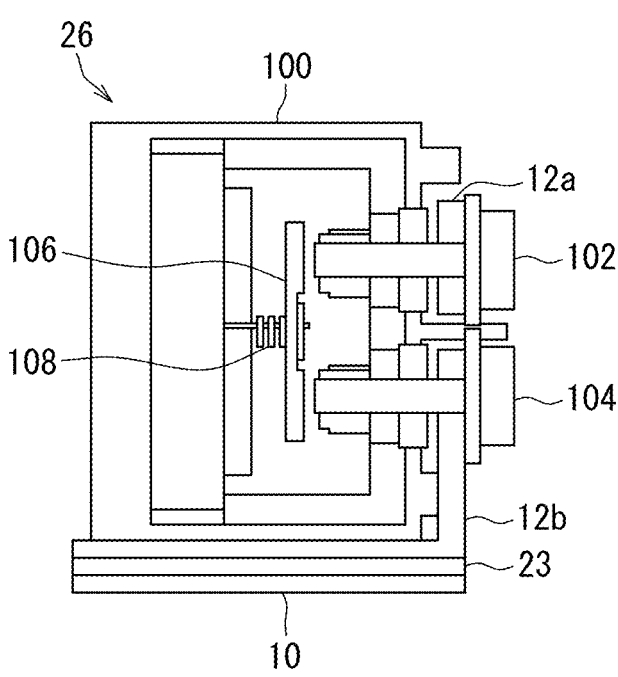
FIG. 5 is a diagram illustrating an example of the relay device.

As shown in FIGS. 4 and 5, the high-potential first busbars 12a, 12b and the low-potential first busbars 14a, 14b have portions extending on an inner bottom surface of the housing 10. Heat dissipation sheets 23, 25 as thermal conductive members are provided between the housing 10 and the portions of the high-potential first busbars 12a, 12b and the low-potential first busbars 14a, 14b extending on the inner bottom surface of the housing 10. The heat dissipation sheets 23, 25 may be, for example, silicone rubber filled with a thermally conductive filler such as aluminum oxide or iron oxide. The heat dissipation sheets 23, 25 are in a form of clay that can be easily deformed, and have high thermal conductivity and electrical insulating property. Therefore, heat is radiated from the high-potential first busbars 12a, 12b and the low-potential first busbars 14a, 14b to the housing 10 via the heat dissipation sheets 23, 25.

As described above, the heat dissipation structure includes the high-potential first busbars 12a, 12b extending on the inner bottom surface of the housing 10, the low-potential first busbars 14a, 14b, the housing 10, and the heat dissipation sheets 23, 25. The heat dissipation structure is capable of reducing heat transfer from the branch portions 18, 20 to the high-potential relay device 26 and the low-potential relay device 28 when the second busbars 12, 14 generate heat. As a result, an increase in temperature of the high-potential relay device 26 and the low-potential relay device 28 can be reduced.

Figure 6:
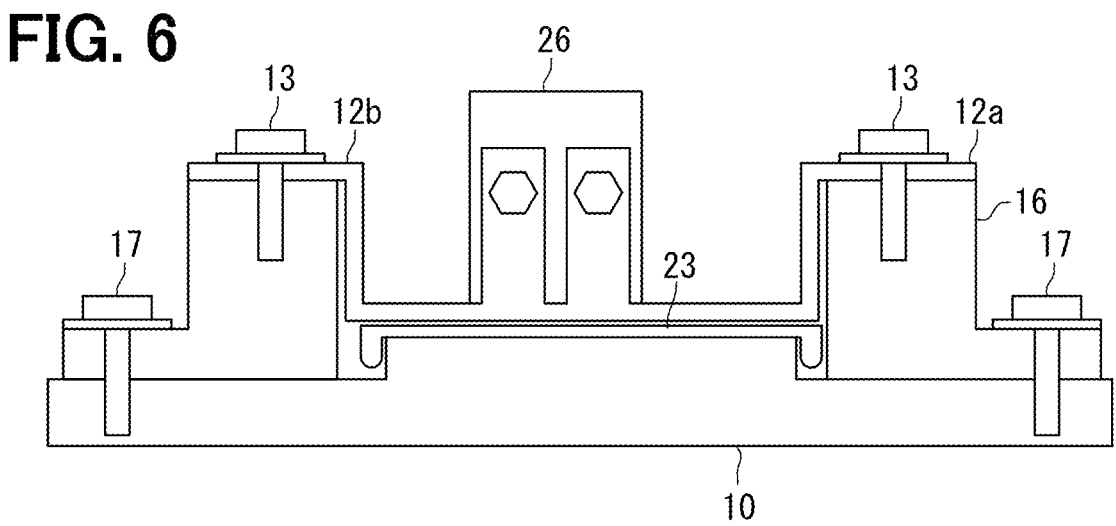
FIG. 6 is a diagram for explaining the heat dissipation structure.

As shown in FIG. 6, the high-potential first busbars 12a, 12b and the low-potential first busbars 14a, 14b are fixed to the outer frame 16 of the relay unit 15 by screws 13. The outer frame 16 is formed form, for example, resin. The outer frame 16 is further fixed to the housing 10 by screws 17.

The high-potential first busbars 12a, 12b and the low-potential first busbars 14a, 14b are fixed to the outer frame 16 by screws, so that the heat dissipation sheets 23, 25 are sandwiched between the housing 10 and the high-potential first busbars 12a, 12b and the low-potential first busbars 14a, 14b, respectively. The heat dissipation sheets 23, 25 are prevented from being displaced by pressure of screw fixing.

Here, as shown in FIG. 6, when the heat dissipation sheets 23, 25 are respectively sandwiched between the high-potential first busbars 12a, 12b and the low-potential first busbars 14a, 14b and the housing 10 and tightened with the screws 13, the clay-like heat dissipation sheet 23 should be deformed and a gap may be provided where the extra heat dissipation sheets 23, 25 protrude. The gap may be provided by providing a step or a groove on the inner surface of the housing 10, or by forming a groove or a through hole on surfaces of the high-potential first busbars 12a, 12b and the low-potential first busbars 14a, 14b on a side in contact with the heat dissipation sheets 23, 25. By providing the gap, it becomes easy to secure a predetermined screw tightening force when screwing the screw 13, and as a result, a sufficient contact pressure of the heat dissipation sheet 23 with respect to the housing 10 and the high-potential first busbars 12a, 12b and the low-potential first busbars 14a, 14b can be obtained. Accordingly, heat dissipation performance through the heat dissipation sheets 23, 25 can be improved.

Figures 7A, 7B:
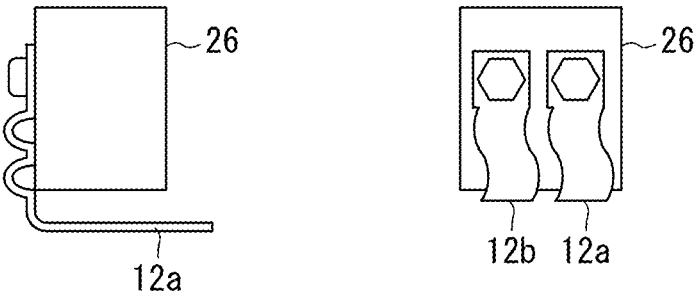
FIG. 7A is a diagram illustrating a shape of the first busbar for increasing an amount of heat dissipation from the first busbar into air.
FIG. 7B is a diagram illustrating another shape of the first busbar for increasing an amount of heat dissipation from the first busbar into air.

As a part of the heat dissipation structure, as shown in FIGS. 4 and 7A, protrusions may be provided at portions of the high-potential first busbars 12a, 12b and the low-potential first busbars 14a, 14b on lateral surfaces of the high-potential relay device 26 and the low-potential relay device 28. As a result, surface areas of the high-potential first busbars 12a, 12b and the low-potential first busbars 14a, 14b are enlarged. As a result, the amount of heat dissipated from the high-potential first busbars 12a, 12b and the low-potential first busbars 14a, 14b into the air can be increased. Shapes of the high-potential first busbars 12a, 12b and the low-potential first busbars 14a, 14b are not limited to the protrusions. Any shape may be used as long as the surface areas of the high-potential first busbars 12a, 12b and the low-potential first busbars 14a, 14b can be increased. For example, as shown in FIG. 7B, the high-potential first busbars 12a, 12b and the low-potential first busbars 14a, 14b may be formed in a wave shape.

Figure 8:
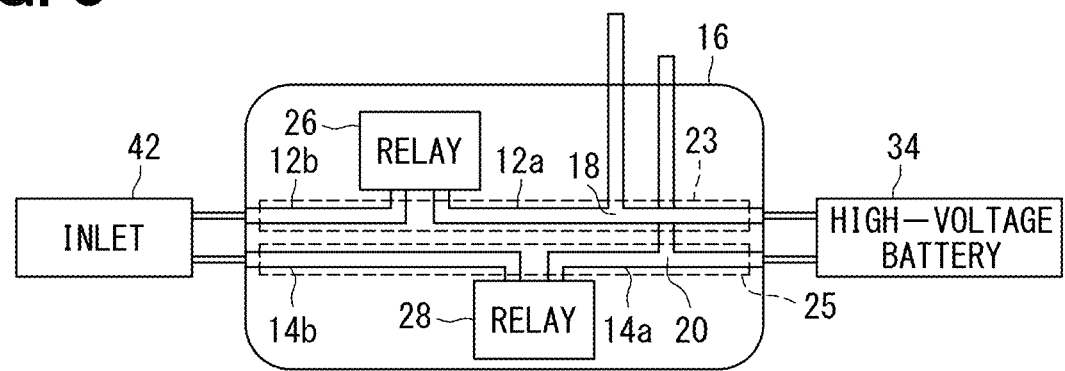
FIG. 8 is a diagram illustrating an example of an installation area of a heat dissipation sheet.

FIG. 8 is a diagram illustrating an example of an installation area of the heat dissipation sheets 23, 25. The heat dissipation sheets 23, 25 forming a part of the heat dissipation structure are provided on both the high-potential first busbars 12a, 12b and the low-potential first busbars 14a, 14b. The heat dissipation sheet 23 for the high-potential first busbars 12a, 12b and the heat dissipation sheet 25 for the low-potential first busbars 14a, 14b are separated from each other. Accordingly, the high-potential first busbars 12a, 12b and the low-potential first busbars 14a, 14b can be reliably prevented from being short-circuited via the heat dissipation sheets 23, 25.

In an example shown in FIG. 8, the heat dissipation sheets 23, 25 are provided not only for the high-potential first busbar 12a and the low-potential first busbar 14a from the branch portions 18, 20 to the high-potential relay device 26 and the low-potential relay device 28, but also for the high-potential first busbar 12b and the low-potential first busbar 14b between the high-potential relay device 26 and the low-potential relay device 28 and the inlet 42. Accordingly, the heat is released to the housing 10 via the heat dissipation sheets 23, 25 when the high-potential relay device 26 and the low-potential relay device 28 generate heat due to the charging current during rapid DC charging by the DC external charging device. Therefore, the temperature rise of the high-potential relay device 26 and the low-potential relay device 28 during the rapid DC charging can be reduced.

Further, as shown in FIG. 8, the heat dissipation sheets 23, 25 may also be provided for a part of the high-potential second busbar 12 and the low-potential second busbar 14 extending from the branch portions 18, 20. Accordingly, the temperature rise of the high-potential second busbar 12 and the low-potential second busbar 14 connected to the branch portions 18, 20 can be reduced during traveling of the vehicle.

As shown in FIG. 8, the high-potential first busbars 12a, 12b and the low-potential first busbars 14a, 14b are formed in linear shapes in parallel as much as possible. The heat dissipation sheets 23, 25 are provided at portions where the high-potential first busbars 12a, 12b and the low-potential first busbars 14a, 14b extend linearly, respectively. As a result, a heat dissipation range by the heat dissipation sheets 23, 25 can be efficiently secured, and the heat dissipation from the high-potential first busbars 12a, 12b and the low-potential first busbars 14a, 14b can be enhanced.

Although the preferred embodiment of the present disclosure has been explained above, the present disclosure is not limited to the above-described embodiment, and can be implemented by various modifications without departing from the spirit of the present disclosure.

Figure 9:
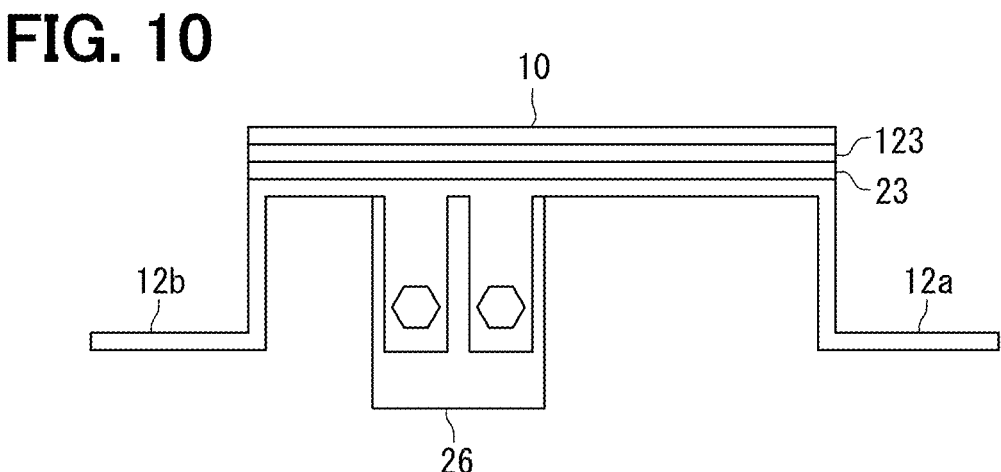
FIG. 9 is a diagram illustrating a heat dissipation structure including an insulating member.

For example, as shown in FIG. 9, in order to further ensure the insulating property between the high-potential first busbars 12a, 12b and the housing 10, and the low-potential first busbars 14a, 14b and the housing 10, an insulating member 123 such as insulating paper may be laminated on the heat dissipation sheets 23, 25, and laminated bodies of the heat dissipation sheets 23, 25 and the insulating member 123 may be sandwiched between the high-potential first busbars 12a, 12b and the low-potential first busbars 14a, 14b and the housing 10.

Figure 10:
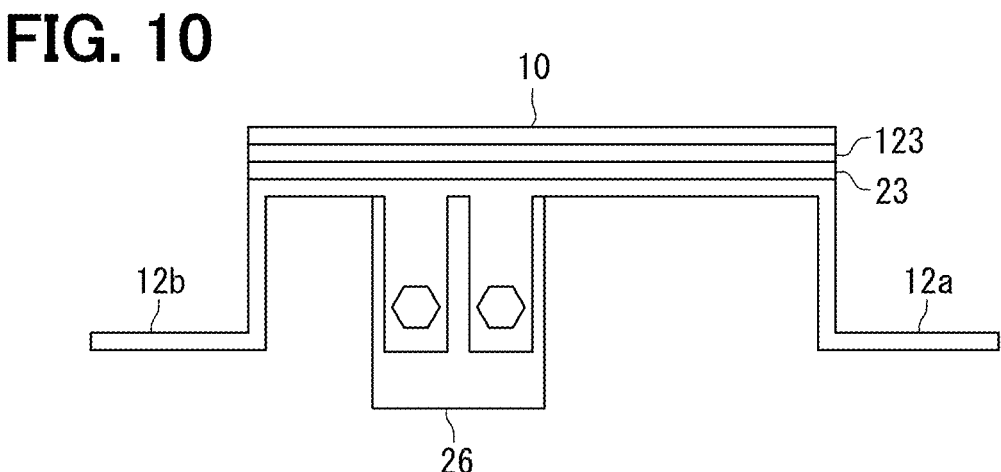
FIG. 10 is a diagram illustrating the heat dissipation structure in a case where the first busbar extends along an inner upper surface of a housing.

In addition, as shown in FIG. 10, the heat dissipation structure may be constituted by the high-potential first busbars 12a, 12b and the low-potential first busbars 14a, 14b extending on an inner upper surface of the housing 10, the housing 10, the heat dissipation sheets 23, 25, and optionally the insulating member 123. That is, the high-potential first busbars 12a, 12b and the low-potential first busbars 14a, 14b may be accommodated in the housing 10 so as to have a portion extending on the inner bottom surface, the inner upper surface, and/or the inner lateral surface of the housing 10, and the heat dissipation sheet 23, 25 may be provided between the housing 10 and a portion of the high-potential first busbars 12a, 12b and the low-potential first busbars 14a, 14b extending on the inner bottom surface, the inner upper surface, and/or the inner lateral surface of the housing 10. In particular, the heat dissipation structure is preferably configured such that the heat dissipation sheet 23 is sandwiched between the high-potential first busbars 12a, 12b and the low-potential first busbars 14a, 14b and the inner upper surface of the housing 10, so that the high-potential relay device 26 and the low-potential relay device 28 are less likely to be affected by the heat dissipated to the housing 10.

Figure 11:
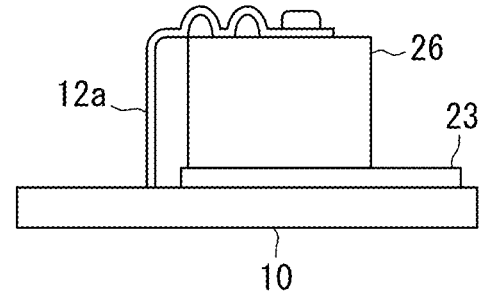
FIG. 11 is a diagram illustrating a shape of the first busbar for increasing the amount of the heat dissipation from the first busbar into the air when the first busbar is formed so as to wrap around from a side surface to the upper surface of the relay device.

In addition, as shown in FIG. 11, the high-potential first busbar 12a may be formed so as to wrap around from the lateral surface to the upper surface of the high-potential relay device 26, and protrusions or wavy portions may be formed in a portion wrapping around the upper surface to increase the amount of heat dissipated from the high-potential first busbar 12a into the air. In this case, protrusions or wavy portions may be provided at a portion of the high-potential first busbar 12a on the lateral surface of the high-potential relay device 26. The high-potential first busbar 12b and the low-potential first busbars 14a, 14b can be configured in the same manner. Further, as shown in FIG. 11, the heat dissipation sheet 23 may be provided so as to be sandwiched between the high-potential relay device 26 and the housing 10, and may be configured so as to dissipate heat from the high-potential relay device 26 to the housing 10. The low-potential relay device 28 may also be configured in the same manner.

Figure 12:
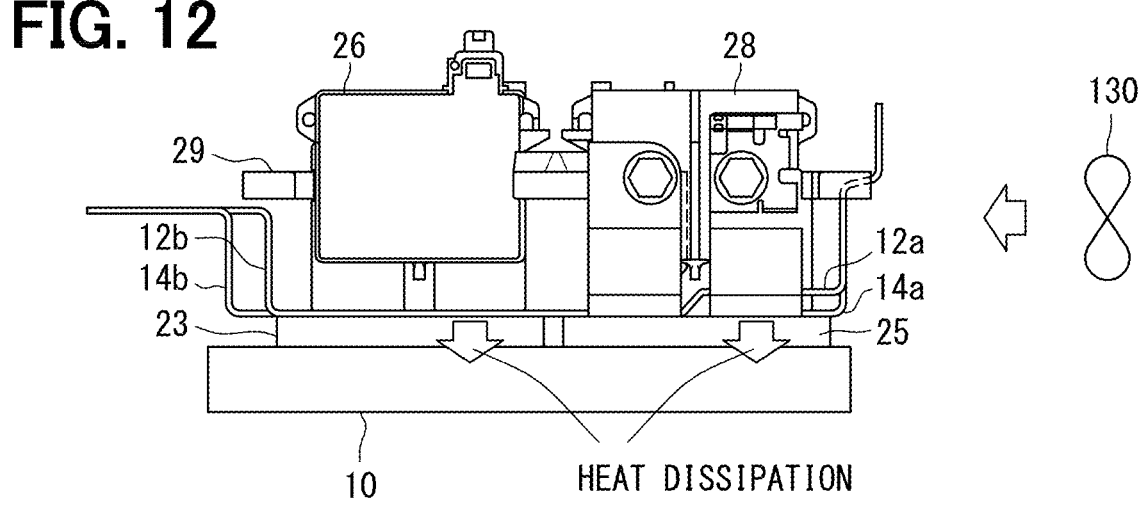
FIG. 12 is a diagram for explaining an example of a forced cooling device.

As shown in FIG. 12, a forced cooling device that forcibly cools the high-potential first busbars 12a, 12b, the low-potential first busbars 14a, 14b, and the like may be provided. FIG. 12 shows an example in which the high-potential first busbars 12a, 12b, the low-potential first busbars 14a, 14b, and the like are forcibly cooled using the cooling air by a fan 130 as the forced cooling device. The forced cooling may be configured to cool the high-potential first busbars 12a, 12b, the low-potential first busbars 14a, 14b, and the like with cooling water.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

12

What is claimed is:

1. A relay unit comprising:
a first busbar forming at least a part of an electric current path between a connecting portion, which is connected to a charging connector of an external charging device, and an in-vehicle battery;
a relay device provided on the first busbar and closed when the in-vehicle battery is charged by the external charging device;
a second busbar forming at least a part of an electric current path between the in-vehicle battery and a power conversion device, which is for driving a traveling motor; and
a heat dissipation structure, wherein
the first busbar is branched at a branch portion from the second busbar, and includes at least a part of an electric current path extending from the branch portion to the connection portion via the relay device, and
the heat dissipation structure dissipates the heat from at least a part of the first busbar between the branch portion and the relay device.

2. The relay unit according to claim 1, wherein
the heat dissipation structure increases a heat dissipation amount per unit area of the part of the first busbar between the branch portion and the relay device over a heat dissipation amount per unit area of the second busbar without the heat dissipation structure.

3. The relay unit according to claim 1, further comprising
a housing accommodating the relay device, the part of the first busbar between the branch portion and the relay device, and at least a part of the second busbar including the branch portion, wherein
the heat dissipation structure includes a thermal conductive member that transfers heat from the first busbar to the housing.

4. The relay unit according to claim 3, wherein
the first busbar is accommodated in the housing, and includes a portion extending along at least one of an inner bottom surface, an inner lateral surface, and an inner upper surface of the housing, and
the thermal conductive member is provided between the portion of the first busbar, which extends along at least one of the inner bottom surface, the inner lateral surface, and the inner upper surface of the housing, and the housing.

5. The relay unit according to claim 3, wherein
the heat dissipation structure has a structure in which the thermal conductive member and an insulating member, which has an insulating property, are stacked and sandwiched between the first busbar and the housing.

6. The relay unit according to claim 1, wherein
an end portion of the first busbar facing the relay device is in metallic contact with a metal member, and
the metal member is in contact with a relay contact of the relay device.

7. The relay unit according to claim 1, wherein
the first busbar includes a high-potential first busbar forming a high-potential current path and a low-potential first busbar forming a low-potential current path,
the second busbar includes a high-potential second busbar forming a high-potential current path and a low-potential second busbar forming a low-potential current path,
the high-potential first busbar is branched from the high-potential second busbar,
the low-potential first busbar is branched from the low-potential second busbar, and
the heat dissipation structure is provided at least for at least one of a part of the high-potential first busbar and a part of the low-potential first busbar between the branch portion and the relay device.

8. The relay unit according to claim 7, wherein the heat dissipation structure is provided on each of the high-potential first busbar and the low-potential first busbar, and the heat dissipation structure provided on the high-potential first busbar and the heat dissipation structure provided on the low-potential first busbar are separated from each other.

9. The relay unit according to claim 7, wherein the heat dissipation structure is provided on a part of the high-potential first busbar and a part of the low-potential first busbar extend linearly.

10. The relay unit according to claim 1, wherein the heat dissipation structure is provided on a part of the first busbar between the relay device and the connecting portion.

11. The relay unit according to claim 1, further comprising a forced cooling device configured to forcibly cool the first busbar.

12. The relay unit according to claim 1, wherein the first busbar has a portion formed in a convex shape or a wavy shape.

\* \* \* \* \*